US012774229B2

(12) United States Patent
Zheng et al.

(10) Patent No.: US 12,774,229 B2
(45) Date of Patent: Oct. 27, 2026

(54) METHOD AND SYSTEM FOR REALIZING RAPID DEGRADATION OF HALOGENATED ORGANIC POLLUTANTS IN WATER

(71) Applicant: TONGJI UNIVERSITY, Shanghai (CN)

(72) Inventors: Xiong Zheng, Shanghai (CN); Yang Wu, Shanghai (CN); Lang Chen, Shanghai (CN); Yinguang Chen, Shanghai (CN); Jiasheng Jin, Shanghai (CN)

(73) Assignee: Tongji University, Shanghai (CN)

( * ) Notice: Subject to any disclaimer, the term of this patent is extended or adjusted under 35 U.S.C. 154(b) by 790 days.

(21) Appl. No.: 17/940,088

(22) Filed: Sep. 8, 2022

(65) Prior Publication Data

US 2023/0357062 A1 Nov. 9, 2023

(30) Foreign Application Priority Data

May 9, 2022 (CN) ......................... 202210497241.6

(51) Int. Cl.
*C02F 1/72* (2023.01)
*C02F 101/36* (2006.01)

(52) U.S. Cl.
CPC .......... *C02F 1/725* (2013.01); *C02F 2101/36* (2013.01); *C02F 2201/007* (2013.01)

(58) Field of Classification Search
CPC ......... C02F 1/725; C02F 1/70; C02F 2101/36
See application file for complete search history.

(56) References Cited

U.S. PATENT DOCUMENTS

| | | | | |
|---|---|---|---|---|
| 7,186,340 | B1 * | 3/2007 | Rittmann | C02F 3/102 210/604 |
| 2018/0050323 | A1 * | 2/2018 | Bruggink | B01J 37/086 |
| 2019/0241452 | A1 * | 8/2019 | Ball | C02F 1/70 |

FOREIGN PATENT DOCUMENTS

| | | | | | |
|---|---|---|---|---|---|
| CN | 102512781 | A | * | 6/2012 | |
| CN | 108275766 | A | * | 7/2018 | C02F 1/722 |
| CN | 109046338 | A | * | 12/2018 | B01J 37/10 |
| CN | 111718039 | A | | 9/2020 | |
| CN | 113683236 | A | * | 11/2021 | C02F 9/00 |
| WO | WO-2020257218 | A1 | * | 12/2020 | C02F 1/66 |
| WO | WO-2021257896 | A1 | * | 12/2021 | B01J 35/45 |

* cited by examiner

*Primary Examiner* — Ryan B Huang
*Assistant Examiner* — Adam Adrien Germain
(74) *Attorney, Agent, or Firm* — Yuhao Liang

(57) ABSTRACT

Disclosed is a system for realizing rapid degradation of halogenated organic pollutants in water. The system comprises a hydrodehalogenation reactor, an advanced oxidation reactor, a hydrogen gas supply unit and a control unit. The system for realizing rapid degradation of halogenated organic pollutants in water comprises a hydrodehalogenation reactor, an advanced oxidation reactor, a hydrogen gas supply unit, and a control unit.

4 Claims, 1 Drawing Sheet

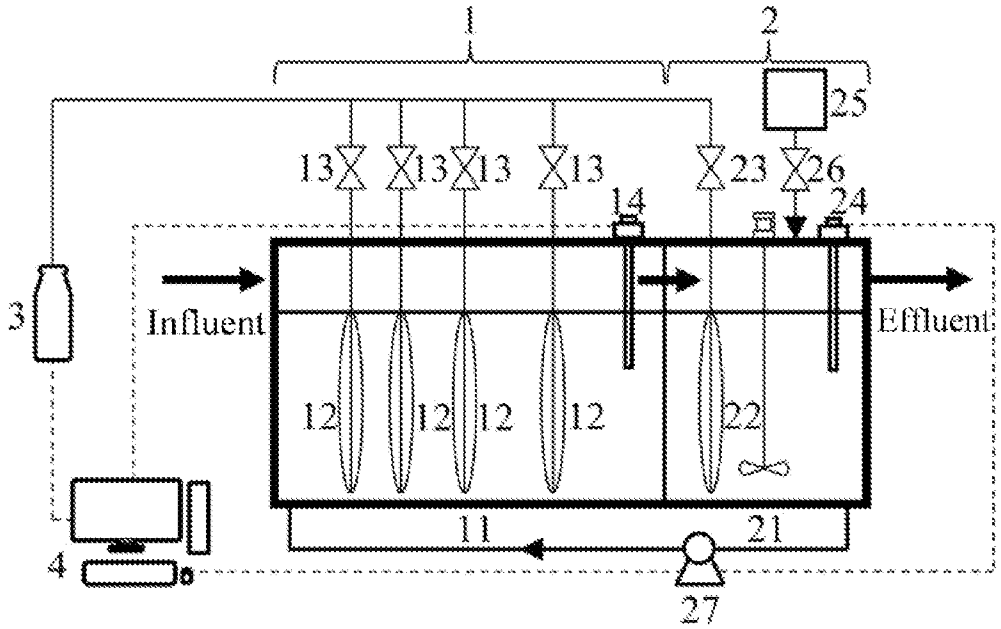
1
2
25
13
13
13
13
23
26
14
24
3
Influent
Effluent
12
12
12
12
22
4
11
21
27

METHOD AND SYSTEM FOR REALIZING RAPID DEGRADATION OF HALOGENATED ORGANIC POLLUTANTS IN WATER

CROSS-REFERENCE TO RELATED PATENT APPLICATION

This non-provisional application claims priority to and the benefit of, pursuant to 35 U.S.C. § 119(a), patent application Serial No. CN202210497241.6 filed in China on May 9, 2022. The disclosure of the above application is incorporated herein in its entirety by reference.

FIELD

The present disclosure relates to the technical field of environmental protection, in particular to a method and system for realizing rapid degradation of halogenated organic pollutants in water.

BACKGROUND

With the continuous development of urbanization and industrialization in our country, the sewage discharge has gradually increased, and the current annual discharge exceeds 60 billion tons. Meanwhile, since new pollutants such as halogenated organic pollutants are widely used in industrial production and consumer products, they are inevitably released into the water environment, resulting in that the content of the pollutants in sewage is gradually increased from ng/L to μg/L, or even to mg/L. Due to the high toxicity and low biodegradability of these organic pollutants, the traditional sewage treatment processes fail to remove them completely. These halogenated pollutants may cause potential harm to humans via biomagnification and food chain transfer, such as the thyroid hormone interference effect, neurotoxicity, and reproductive and developmental toxicity. Therefore, ensuring the effective removal of new pollutants such as halogenated pollutants in sewage is the key to ensuring the safety of water environment and human health.

At present, hydrodehalogenation, due to the mild reaction conditions and no secondary pollution, is considered to be a promising method for treating halogenated organic pollutants. In the hydrodehalogenation, palladium is often used due to its strong capability to adsorb and dissociate hydrogen. However, due to the limited gas mass transfer, continuous introduction of hydrogen is necessary to the current process of the hydrodehalogenation reaction, which fails to achieve accurate hydrogen supply and brings serious safety hazards. A membrane-supported palladium-based reactor may solve these disadvantages by loading palladium on the surface of hollow fiber membranes, where hydrogen is spontaneously transferred from inside to the surface under pressure to proceed the hydrodehalogenation reaction.

Although the hydrodehalogenation can effectively reduce and dehalogenate the halogenated organic pollutants, it is difficult to perform ring-opening degradation of benzene rings in the degradation products, which thereby may still bring potential risks to the environment. For example, bisphenol A, a product of hydrodehalogenation of tetrahalobisphenol A, is still a persistent organic pollutant and requires to be further treated. In addition, the advanced oxidation process is another technique which can effectively remove the halogenated organic pollutants. However, the advanced oxidation may produce halogenated by-products being more toxic.

Therefore, by combining the hydrodehalogenation and the advanced oxidation, it is possible to achieve the safe and harmless degradation of the halogenated organic pollutants. However, for the advanced oxidation process, the pollutant degradation relies on the active radicals generated by activation of a persulfate, and the activation is achieved by the traditional activation catalysts which are metals such as iron and copper. Whether palladium can also be used to activate the persulfate is still unknown. Meanwhile, there are many uncertain factors in the operation and control of the system, which need to be urgently solved.

CN202010402913.1 provides a method and device for treating combined pollution of various chlorinated hydrocarbons in underground water, in which an electrochemical oxidation reactor and a palladium-catalyzed hydrogenation reduction reactor are synchronized in time and separated apart in space to achieve a step-by-step treatment. The chlorinated hydrocarbons that can be oxidized are first degraded in the electrochemical oxidation reactor, and then the chlorinated hydrocarbons that can be reduced are degraded in the palladium-catalyzed hydrogenation reduction reactor, making it possible to restore the underground water which is affected by the combined pollution of chlorinated hydrocarbons.

The technology produces both ferrous iron and hydrogen by the electrode of the electrochemical oxidation reactor, and the hydrogen flows together with the water flow to the palladium column to reduce and degrade some of the chlorinated hydrocarbons. However, due to the low solubility of hydrogen in water, the generated hydrogen may not only bring about a safety hazard, but also lead to insufficient hydrogen to be supplied to the palladium column for catalytic reduction. In addition, this technology can only completely degrade 5 mg/L trichloroethylene after 18 h, which takes a long reaction time.

SUMMARY

In view of the above problems existing in the prior art, the present disclosure provides a method and system for realizing rapid degradation of halogenated organic pollutants in water. The present disclosure enables the complete degradation of the halogenated organic pollutants by first subjecting the halogenated organic pollutants to hydrodehalogenation, followed by advanced oxidation of the dehalogenated product with a persulfate.

Technical solutions of the present disclosure are described as follows.

The present disclosure discloses a system for realizing rapid degradation of halogenated organic pollutants in water, comprising a hydrodehalogenation reactor, an advanced oxidation reactor, a hydrogen gas supply unit, and a control unit;

- wherein the hydrodehalogenation reactor comprises a first reactor body, membrane modules, a first hydrogen control valve, and a first pollutant detection unit;
- wherein the membrane modules are provided in parallel and vertically within the first reactor body; the hydrogen gas supply unit is sequentially communicated to each of the membrane modules via the first hydrogen control valve; and the first pollutant detection unit is further provided in the first reactor body to dynamically adjust the hydrogen supply pressure according to the concentration of the halogenated organic pollutants, thereby ensuring that the hydrodehalogenation rate matches the advanced oxidation rate;

wherein the advanced oxidation reactor comprises a second reactor body, membrane modules, a second hydrogen control valve, a second pollutant detection unit, a persulfate feed tank, a feed control valve, and a reflux pump;

wherein the membrane modules are provided within the second reactor body; the hydrogen gas supply unit is communicated to each of the membrane modules via the second hydrogen control valve; and the second pollutant detection unit is further provided in the second reactor body to dynamically adjust the rate of the reflux pump according to the concentration of the halogenated organic pollutants, thereby ensuring that the hydrodehalogenation rate matches the advanced oxidation rate;

wherein the persulfate feed tank is communicated to the second reactor body via the feed control valve;

wherein the control unit is connected to the hydrogen gas supply unit, the first hydrogen control valve, the second hydrogen control valve, the first pollutant detection unit, the second pollutant detection unit, the persulfate feed tank, and the feed control valve, respectively.

Preferably, the membrane modules 12 and the membrane modules 22 are polyethylene non-porous hollow fiber membranes, polypropylene non-porous hollow fiber membranes, or other non-porous hollow fiber membranes. More preferably, the membrane modules 12 and the membrane modules 22 are polyethylene non-porous hollow fiber membranes.

Preferably, the membrane modules are in an arrangement with a gradually increased interval along a water flow direction.

The present disclosure also provides a method for realizing rapid degradation of halogenated organic pollutants in water by said system, comprising steps of:

S1: introducing a palladium salt solution with a concentration of 0.5-1.5 mM into the first reactor body 11 and the second reactor body 21, opening the hydrogen gas supply unit 3, the first hydrogen control valve 13 and the second hydrogen control valve 23, and reducing and loading the palladium onto the surfaces of the membrane modules 12 and the membrane modules 22 under a hydrogen gas supply pressure of 4-8 psi for a loading time of 12-36 h with the pH controlled to be 5-9;

S2: introducing a wastewater containing the halogenated organic pollutants into the first reactor body 11, and subjecting the halogenated organic pollutants to reductive dehalogenation with palladium catalysis under the hydrogen gas supply pressure, wherein the hydrogen is supplied in an intermittent mode with a hydrogen supply/stop time of 0-2.0 h, the hydraulic retention time is 0.5-2 h, and the influent pH is 5-9;

S3: closing the second hydrogen control valve 23, introducing the dehalogenated wastewater into the second reactor body 21, and adding a persulfate in an amount of 0.5-1.5 mM into the second reactor body 21 for advanced oxidation under the control of the persulfate feed tank 25, with a hydraulic retention time of 0.1-1.0 h;

S4: detecting, in a real-time manner, the concentration of the pollutants in the first reactor body 11 and the second reactor body 21 by using the control unit 4, the first pollutant detection unit 14 and the second pollutant detection unit 24, wherein the first hydrogen control valve 13 is used to dynamically adjust the hydrogen pressure, and the reflux pump 27 is used to dynamically adjust the reflux rate, thereby ensuring that the hydrodehalogenation rate matches the advanced oxidation rate.

Preferably, the palladium salt in the step S1 is palladium chloride, palladium sulfate or sodium tetrachloropalladate.

Preferably, the step S1 is controlled such that the concentration of the palladium salt is 1 mM, the hydrogen gas supply pressure is 6 psi, the loading time is 24 h, and the pH is 7.

Preferably, in the wastewater containing the halogenated organic pollutants in the step S2, the pollutants include chlorinated organic pollutants, brominated organic pollutants, or a mixture thereof.

Preferably, the wastewater containing the halogenated organic pollutants in the step S2 has a concentration of 1-100 mmol/L.

Preferably, the step S2 is controlled such that the hydrogen supply/stop time is 1.0 h, the hydraulic retention time is 1.0 h, and the influent pH is 7.

Preferably, in the step S3, the persulfate is sodium persulfate, potassium persulfate, or a mixture thereof; the persulfate is controlled to be added in an amount of 1 mM; and the hydraulic retention time is controlled to be 0.5 h.

The present disclosure has the following beneficial technical effects:

1. In the present system, palladium can not only provide catalytic sites during the hydrodehalogenation stage, but also activate a persulfate to promote the generation of active radicals during the advanced oxidation stage. However, in the traditional advanced oxidation process, the degradation of the pollutants relies on the active radicals generated by activation of a persulfate, and the activation is achieved by a traditional activation catalyst being metals such as iron and copper. At present, there has been no literature that reports a technology of in-situ activation of a persulfate by palladium.

2. The present disclosure is an integrated technology, in which two stages of the reactions are combined, and an automatic control system is provided to realize the matching of the hydrodehalogenation rate and the advanced oxidation rate, thereby realizing the complete degradation of the halogenated organic pollutants. Therefore, the present disclosure has the advantages including being simple to operate and high automation.

3. It is firstly discovered in the present disclosure that, the halide ions generated from the hydrodehalogenation can be combined with the persulfate to generate halogen radicals during the advanced oxidation stage, and the halogen radicals can be used to enhance the advanced oxidation performances and further promote the degradation of the dehalogenation products, which produces unexpected results. There has been no literature that reports the key role of the halide ions generated from the hydrodehalogenation of the present disclosure in a combined technology. As compared with the traditional advanced oxidation process, the present disclosure realizes an integrated reaction and further reduces the operation cost, with no need of additional activation.

4. In the present disclosure, an intermittent gas supply mode is used during the hydrodehalogenation for the first time. By supplying the hydrogen in a membrane aeration manner and in an intermittent mode, the present disclosure has the advantages including a high hydrogen utilization ratio and a low hydrogen supply amount as compared with the traditional aeration. Therefore, the present disclosure not only saves the operation cost, but also is safer and more reliable.

5. The present disclosure is provided with an automatic control system, which can make corresponding feedback in a real-time manner according to the concentration of the pollutants in the reactor. This automatic control system, by dynamically adjusting the hydrogen partial pressure and the rate of the reflux pump, is used to ensure that the hydrodehalogenation rate matches the advanced oxidation rate and the whole system operates stably. Therefore, the present disclosure has the advantages including being simple to operate and high automation.

6. As compared with CN202010402913.1, the present disclosure, by supplying the hydrogen in a membrane aeration manner and in an intermittent mode, has the advantages including a high hydrogen utilization ratio and a low hydrogen supply amount compared with the traditional aeration. Therefore, the present disclosure not only saves the operation cost, but also is safer and more reliable.

In addition, the technology of CN202010402913.1 is fundamentally different in terms of the reaction principles from the present disclosure, which is in that, the technology of CN202010402913.1 realizes the degradation of the pollutants by activating the persulfate by using iron to generate active radicals, while the present disclosure innovatively discovers that the persulfate can be activated in-situ by using palladium. In addition, the present disclosure only takes a time of 1.5 h to achieve the efficient degradation of the halogenated organic pollutants under the optimal conditions, which is only 1/12 of that taken by the technology of CN202010402913.1, and produces low-toxicity effluent products.

7. As compared with the traditional biological treatment and advanced oxidation treatment processes, the present disclosure has the advantages including a fast degradation rate, a high removal efficiency, and low toxicity of the effluent products. The present disclosure has the advantages including a fast degradation rate of the halogenated organic pollutants, a removal efficiency of ≥99%, low toxicity of the effluent products, a hydrogen utilization ratio of ≥99%, and no need for additional persulfate activation.

BRIEF DESCRIPTION OF DRAWINGS

FIG. 1 is a structural schematic diagram of a system for improving the rapid degradation of halogenated organic pollutants in water according to the present disclosure.

In the FIGURE, the corresponding relationship between the component names and reference numerals is:

1—hydrodehalogenation reactor, 11—first reactor body, 12—membrane module, 13—first hydrogen control valve, 14—first pollutant detection unit;

2—advanced oxidation reactor, 21—second reactor body, 22—membrane module, 23—second hydrogen control valve, 24—second pollutant detection unit, 25—persulfate feed tank, 26—feed control valve, 27—reflux pump;

3—hydrogen gas supply unit; 4—control unit.

DETAILED DESCRIPTION

Hereinafter, the present disclosure is described in detail in conjunction with the drawings and examples. Obviously, the described examples are only a part of the examples of the present disclosure, rather than all of them. All the other examples, which are based on the examples in the present disclosure, obtained by those of ordinary skill in the art without creative labor, should fall within the protection scope of the present disclosure.

Example 1

As shown in FIG. 1, this example provides a system for realizing rapid degradation of halogenated organic pollutants in water, comprising a hydrodehalogenation reactor 1, an advanced oxidation reactor 2, a hydrogen gas supply unit 3, and a control unit 4.

The hydrodehalogenation reactor 1 comprises a first reactor body 11, membrane modules 12, a first hydrogen control valve 13, and a first pollutant detection unit 14.

The membrane modules 12 are provided in parallel and vertically within the first reactor body 11. The hydrogen gas supply unit 3 is sequentially communicated to each of the membrane modules 12 via the first hydrogen control valve 13. The first pollutant detection unit 14 is further provided in the first reactor body 11 to dynamically adjust the hydrogen supply pressure according to the concentration of the halogenated organic pollutants, thereby ensuring that the hydrodehalogenation rate matches the advanced oxidation rate.

The advanced oxidation reactor 2 comprises a second reactor body 21, membrane modules 22, a second hydrogen control valve 23, a second pollutant detection unit 24, a persulfate feed tank 25, a feed control valve 26, and a reflux pump 27. The membrane modules 12 and the membrane modules 22 are polyethylene non-porous hollow fiber membranes, polypropylene non-porous hollow fiber membranes, or other non-porous hollow fiber membranes, preferably polypropylene hollow fiber membranes. The membrane modules 12 and the membrane modules 22 are in an arrangement with a gradually increased interval along a water flow direction.

The membrane modules 22 are provided within the second reactor body 21. The hydrogen gas supply unit 3 is communicated to each of the membrane modules 22 via the second hydrogen control valve 23. The second pollutant detection unit 24 is further provided in the second reactor body 21 to dynamically adjust the rate of the reflux pump 27 according to the concentration of the halogenated organic pollutants, thereby ensuring that the hydrodehalogenation rate matches the advanced oxidation rate.

The persulfate feed tank 25 is communicated to the second reactor body 21 via the feed control valve 26.

The control unit 4 is connected to the hydrogen gas supply unit 3, the first hydrogen control valve 13, the second hydrogen control valve 23, the first pollutant detection unit 14, the second pollutant detection unit 24, the persulfate feed tank 25, and the feed control valve 26, respectively.

Example 2

This example provides a method for rapid degradation of a halogenated organic pollutant in a wastewater, wherein the halogenated organic pollutant in the wastewater was tetrabromobisphenol A with a concentration of 50 mmol/L. Specific steps were as follows.

S1: A sodium tetrachloropalladate solution with a concentration of 1.0 mM was introduced into the first reactor body 11 and the second reactor body 21. The hydrogen gas supply unit 3, the first hydrogen control valve 13 and the second hydrogen control valve 23 were opened. The palladium was reduced and loaded onto the surfaces of the membrane modules under a hydrogen gas supply pressure of 6 psi for a loading time of 24 h with the pH controlled to be 7.

S2: The wastewater containing the halogenated organic pollutant was introduced into the first reactor body 11, and the halogenated organic pollutant was subjected to the reductive dehalogenation with palladium catalysis under the hydrogen gas supply pressure, wherein the hydrogen was supplied in an intermittent mode with a hydrogen supply/stop time of 1.0 h, the hydraulic retention time was 1.0 h, and the influent pH was 7.

Although the hydrogen was closed after it was introduced for 1 h, there was still a large amount of hydrogen in the membranes. Under the pressure action, the hydrogen continued to exude from the surfaces of the membranes to provide palladium for catalyzing the reduction reaction, such that the usage amount of the hydrogen was effectively saved by using this intermittent gas supply mode.

S3: The second hydrogen control valve 23 is closed, and the dehalogenated wastewater was introduced into the second reactor body 21. To the second reactor body 21, sodium persulfate in an amount of 1.0 mM was added for advanced oxidation under the control of the persulfate feed tank 25, with a hydraulic retention time of 0.5 h.

S4: The concentration of the pollutant in the first reactor body 11 and the second reactor body 21 was detected in a real-time manner by using the control unit 4, the first pollutant detection unit 14 and the second pollutant detection unit 24, wherein the hydrogen control valve 13 was used to dynamically adjust the hydrogen pressure, and the reflux pump 27 was used to dynamically adjust the reflux rate, respectively, thereby ensuring that the hydrodehalogenation rate matched the advanced oxidation rate.

Compared with the conventional halogenated organic pollutant biological treatment system (conventional sewage treatment $A^2/O$ process), by using this method, the removal efficiency of the halogenated organic pollutant was increased from 50.4% to 99.3%, which was increased by 97.2%; the gas utilization ratio was increased from 40.1% to 99.7%, which was increased by 148.6%; and the treatment time was decreased from 10 h to 1.5 h, which was decreased by 85%.

Meanwhile, compared with the reference document CN202010402913.1, by using this method, the usage amount of the persulfate was decreased from 30 mM to 1 mM, which was saved by 96.7%. The treatment time was decreased from 18 h to 1.5 h, which was decreased by 91.7%. At the same time, this method was carried out with no addition of ligand substances such as EDTA and citric acid, produced a low-toxicity product and caused no secondary pollution to environment.

Example 3

This example provides a method for rapid degradation of a halogenated organic pollutant in a wastewater, wherein the halogenated organic pollutant in the wastewater was hydroquinone with a concentration of 80 mmol/L. Specific steps were as follows.

S1: A palladium sulfate solution with a concentration of 0.5 mM was introduced into the first reactor body 11 and the second reactor body 21. The hydrogen gas supply unit 3, the first hydrogen control valve 13 and the second hydrogen control valve 23 were opened. The palladium was reduced and loaded onto surfaces of the membrane modules under a hydrogen gas supply pressure of 4 psi for a loading time of 36 h with the pH controlled to be 6.

S2: The wastewater containing the halogenated organic pollutant was introduced into the first reactor body 11, and the halogenated organic pollutant was subjected to the reductive dehalogenation with palladium catalysis under the hydrogen gas supply pressure, wherein the hydrogen was supplied in an intermittent mode with a hydrogen supply/stop time of 0.5 h, the hydraulic retention time was 0.5 h, and the influent pH was 6.

Although the hydrogen was closed after it was introduced for 0.5 h, there was still a large amount of hydrogen in the membranes. Under the pressure action, the hydrogen continued to exude from the surfaces of the membranes to provide palladium for catalyzing the reduction reaction, such that the usage amount of the hydrogen was effectively saved by using this intermittent gas supply mode.

S3: The second hydrogen control valve 23 is closed, and the dehalogenated wastewater was introduced into the second reactor body 21. To the second reactor body 21, potassium persulfate in an amount of 0.5 mM was added for advanced oxidation under the control of the persulfate feed tank 25, with a hydraulic retention time of 0.1 h.

S4: The concentration of the pollutant in the first reactor body 11 and the second reactor body 21 was detected in a real-time manner by using the control unit 4, the first pollutant detection unit 14 and the second pollutant detection unit 24, wherein the hydrogen control valve 13 was used to dynamically adjust the hydrogen pressure, and the reflux pump 27 was used to dynamically adjust the reflux rate, respectively, thereby ensuring that the hydrodehalogenation rate matched the advanced oxidation rate.

Compared with the conventional halogenated organic pollutant biological treatment system (conventional sewage treatment $A^2/O$ process), by using this method, the removal efficiency of the halogenated organic pollutant was increased from 50.4% to 75.1%, which was increased by 49.0%; the gas utilization ratio was increased from 40.1% to 98.5%, which was increased by 145.6%; and the treatment time was decreased from 10 h to 0.6 h, which was decreased by 94%.

Example 4

This example provides a method for rapid degradation of a halogenated organic pollutant in a wastewater, wherein the halogenated organic pollutant in the wastewater was perfluorooctane sulfonic acid with a concentration of 20 mmol/L. Specific steps were as follows.

S1: A palladium chloride solution with a concentration of 1.5 mM was introduced into the first reactor body 11 and the second reactor body 21. The hydrogen gas supply unit 3, the first hydrogen control valve 13 and the second hydrogen control valve 23 were opened. The palladium was reduced and loaded onto surfaces of the membrane modules under a hydrogen gas supply pressure of 8 psi for a loading time of 12 h with the pH controlled to be 8.

S2: The wastewater containing the halogenated organic pollutant was introduced into the first reactor body 11, and the halogenated organic pollutant was subjected to the reductive dehalogenation with palladium catalysis under the hydrogen gas supply pressure, wherein the hydrogen was supplied in an intermittent mode with a hydrogen supply/stop time of 2.0 h, the hydraulic retention time was 2.0 h, and the influent pH was 8.

Although the hydrogen was closed after it was introduced for 2.0 h, there was still a large amount of hydrogen in the membranes. Under the pressure action, the hydrogen continued to exude from the surfaces of the membranes to provide palladium for catalyzing the reduction reaction, such that the usage amount of the hydrogen was effectively saved by using this intermittent gas supply mode.

S3: The second hydrogen control valve 23 is closed, and the dehalogenated wastewater was introduced into the second reactor body 21. To the second reactor body 21, a mixture of sodium persulfate and potassium persulfate (with the amount of sodium persulfate and potassium persulfate each being 50 wt %) in an amount of 1.5 mM was added for advanced oxidation under the control of the persulfate feed tank 25, with a hydraulic retention time of 1 h.

S4: The concentration of the pollutant in the first reactor body 11 and the second reactor body 21 was detected in a real-time manner by using the control unit 4, the first pollutant detection unit 14 and the second pollutant detection unit 24, wherein the hydrogen control valve 13 was used to dynamically adjust the hydrogen pressure, and the reflux pump 27 was used to dynamically adjust the reflux rate, respectively, thereby ensuring that the hydrodehalogenation rate matched the advanced oxidation rate.

Compared with the conventional halogenated organic pollutant biological treatment system (conventional sewage treatment $A^2/O$ process), by using this method, the removal efficiency of the halogenated organic pollutant was increased from 50.4% to 89.3%, which was increased by 77.2%; the gas utilization ratio was increased from 40.1% to 97.3%, which was increased by 142.6%; and the treatment time was decreased from 10 h to 3.0 h, which was decreased by 70%.

Although the embodiments of the present disclosure have been disclosed as above, the disclosure is not limited to the applications as listed in the description and embodiments, and it can be completely applied to various fields suitable for the present disclosure. For those familiar with the art and those of ordinary skill in the art, various changes, modifications, substitutions and variations can be made to these embodiments without departing from the principle and spirit of the present disclosure, and therefore, the present disclosure is not limited to the specific details without departing from the general concepts defined by the claims and equivalent scopes.

What is claimed is:

1. A system for realizing rapid degradation of halogenated organic pollutants in water, comprising a hydrodehalogenation reactor (1), an advanced oxidation reactor (2), a hydrogen gas supply unit (3), and a control unit (4);

wherein the hydrodehalogenation reactor (1) comprises a first reactor body (11), a first group of membrane modules (12), a first hydrogen control valve (13), and a first pollutant detection unit (14);

wherein the first group of membrane modules (12) are provided in parallel and vertically within the first reactor body (11) and are loaded with a palladium catalyst; the hydrogen gas supply unit (3) is sequentially communicated to each of the first group of membrane modules (12) via the first hydrogen control valve (13); and the first pollutant detection unit (14) is further provided in the first reactor body (11) to dynamically adjust the hydrogen supply pressure according to the concentration of the halogenated organic pollutants, thereby ensuring that a hydrodehalogenation rate matches an advanced oxidation rate;

wherein the hydrodehalogenation reactor (1) is configured to catalytically convert the halogenated organic pollutants into dehalogenated products and halide ions using the palladium catalyst;

wherein the advanced oxidation reactor (2) comprises a second reactor body (21), a second group of membrane modules (22), a second hydrogen control valve (23), a second pollutant detection unit (24), a persulfate feed tank (25), a feed control valve (26), and a reflux pump (27);

wherein the second group of membrane modules (22) are provided within the second reactor body (21) and are loaded with the palladium catalyst; the hydrogen gas supply unit (3) is communicated to each of the second group of membrane modules (22) via the second hydrogen control valve (23); and the second pollutant detection unit (24) is further provided in the second reactor body (21) to dynamically adjust the rate of the reflux pump (27) according to the concentration of the halogenated organic pollutants, thereby ensuring that the hydrodehalogenation rate matches the advanced oxidation rate;

wherein the advanced oxidation reactor (2) is configured to receive the dehalogenated products and the halide ions from the hydrodehalogenation reactor (1), and utilizes the palladium catalyst and the halide ions to activate a persulfate supplied from the persulfate feed tank (25) to generate active radicals for degradation of the dehalogenated products;

wherein the persulfate feed tank (25) is communicated to the second reactor body (21) via the feed control valve (26);

wherein the control unit (4) is connected to the hydrogen gas supply unit (3), the first hydrogen control valve (13), the second hydrogen control valve (23), the first pollutant detection unit (14), the second pollutant detection unit (24), the persulfate feed tank (25), and the feed control valve (26), respectively.

2. The system according to claim 1, wherein the first group of membrane modules (12) and the second group of membrane modules (22) are polyethylene non-porous hollow fiber membranes or polypropylene non-porous hollow fiber membranes.

3. The system according to claim 1, wherein the first group of membrane modules (12) and the second group of membrane modules (22) are in an arrangement with a gradually increased interval along a water flow direction.

4. The system according to claim 1, wherein the first pollutant detection unit (14) is configured to detect a completion of dehalogenation, and the control unit (4) allows transfer of water to the advanced oxidation reactor (2) only upon detection that the halogenated organic pollutants have been substantially dehalogenated.

* * * * *